(12) United States Patent
Marchildon et al.

(10) Patent No.: US 10,035,550 B2
(45) Date of Patent: Jul. 31, 2018

(54) TRACK SYSTEM

(71) Applicant: Soucy International Inc., Drummondville, Quebec (CA)

(72) Inventors: Louis-Frederic Marchildon, Drummondville (CA); Patrick L'Herault, St-Majorique de Grantham (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 15/130,630

(22) Filed: Apr. 15, 2016

(65) Prior Publication Data
US 2016/0304141 A1    Oct. 20, 2016

(30) Foreign Application Priority Data
Apr. 16, 2015    (CA) ...................................... 2887839

(51) Int. Cl.
*B62D 55/08*     (2006.01)
*B62D 55/04*     (2006.01)
(52) U.S. Cl.
CPC .................................. *B62D 55/04* (2013.01)
(58) Field of Classification Search
CPC ........ B62D 55/08; B62D 55/10; B62D 55/12; B62D 55/14; B62D 55/24; B62D 55/04; B62D 55/06
USPC ....... 305/124, 129, 130, 132, 135, 136, 137, 305/140, 142, 187, 193
See application file for complete search history.

(56) References Cited

U.S. PATENT DOCUMENTS

| | | | | |
|---|---|---|---|---|
| 8,911,031 B2* | 12/2014 | Bessette | ............... | B62D 55/084 305/128 |
| 8,955,925 B2* | 2/2015 | Bessette | ................ | B62D 55/14 180/9.1 |
| 9,415,817 B2* | 8/2016 | Rackow | ............... | B62D 55/112 |
| 2003/0159859 A1* | 8/2003 | Boivin | ................... | B62D 55/04 180/9.26 |
| 2007/0240917 A1* | 10/2007 | Duceppe | ................ | B62D 15/00 180/9.21 |
| 2008/0011524 A1* | 1/2008 | Despres | ............... | B62D 55/108 180/9.21 |
| 2012/0104840 A1* | 5/2012 | Zuchoski | ............... | B62D 55/10 305/100 |
| 2015/0329154 A1* | 11/2015 | Roy | ....................... | B62D 55/14 180/9.21 |

* cited by examiner

*Primary Examiner* — S. Joseph Morano
*Assistant Examiner* — Jean Charleston
(74) *Attorney, Agent, or Firm* — BCF LLP

(57) ABSTRACT

A track system for use as a replacement of a steerable wheel on a normally wheeled vehicle, is configured to improve the handling of the vehicle when operated over hard surface (e.g. packed dirt, pavement, concrete, etc.). The track system generally comprises a drive wheel configured to be mounted to the vehicle, a support frame mounted to the drive wheel or to the vehicle, front and rear idler wheels respectively pivotally mounted at the front and at the rear of the support frame, road wheels pivotal mounted along the length of the support frame, and a traction band disposed about the wheels and configured to be driven by the drive wheel. The road wheels are particularly configured to improve the handling of the vehicle when the track systems are operated over hard surface.

19 Claims, 20 Drawing Sheets

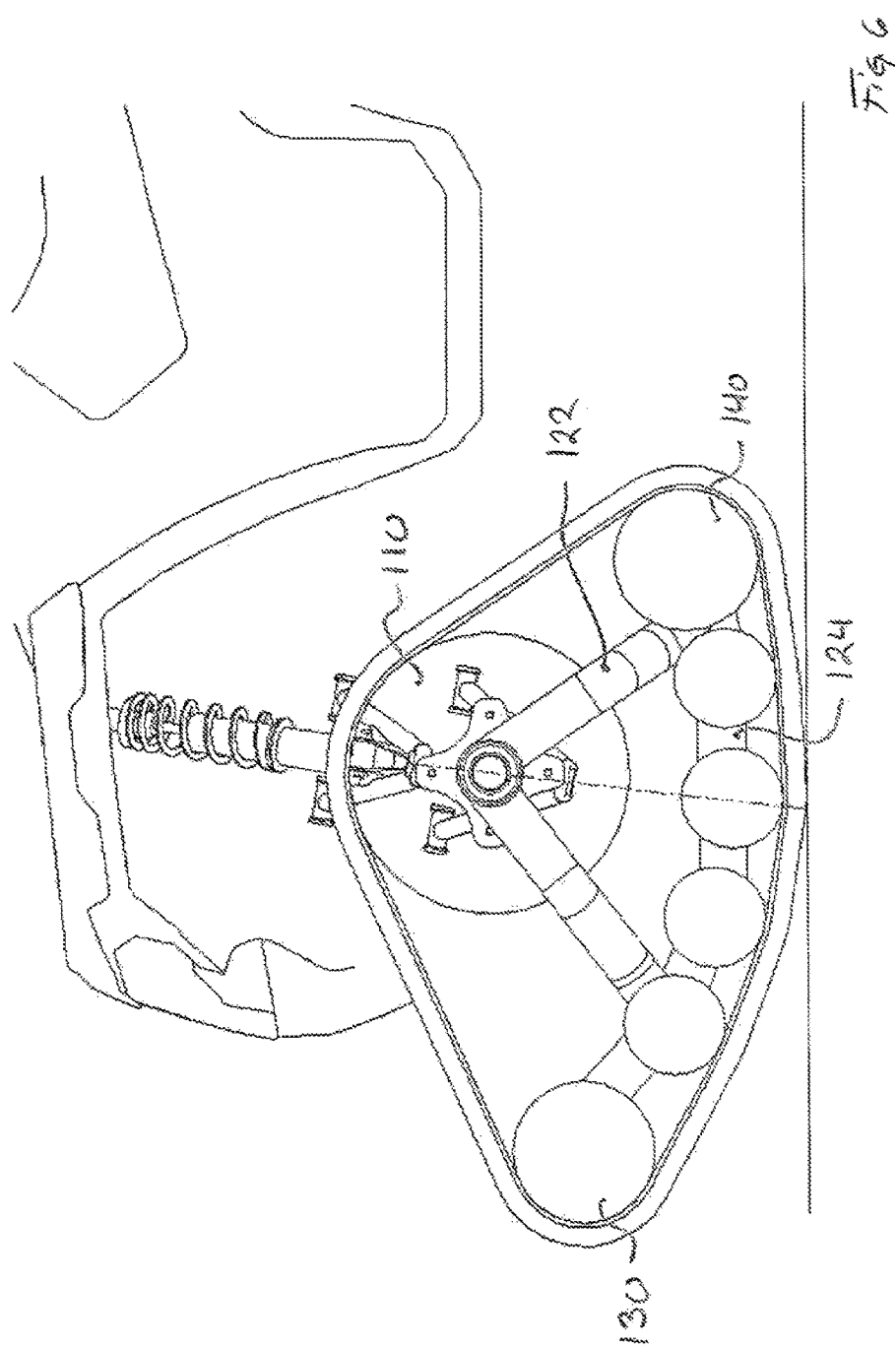

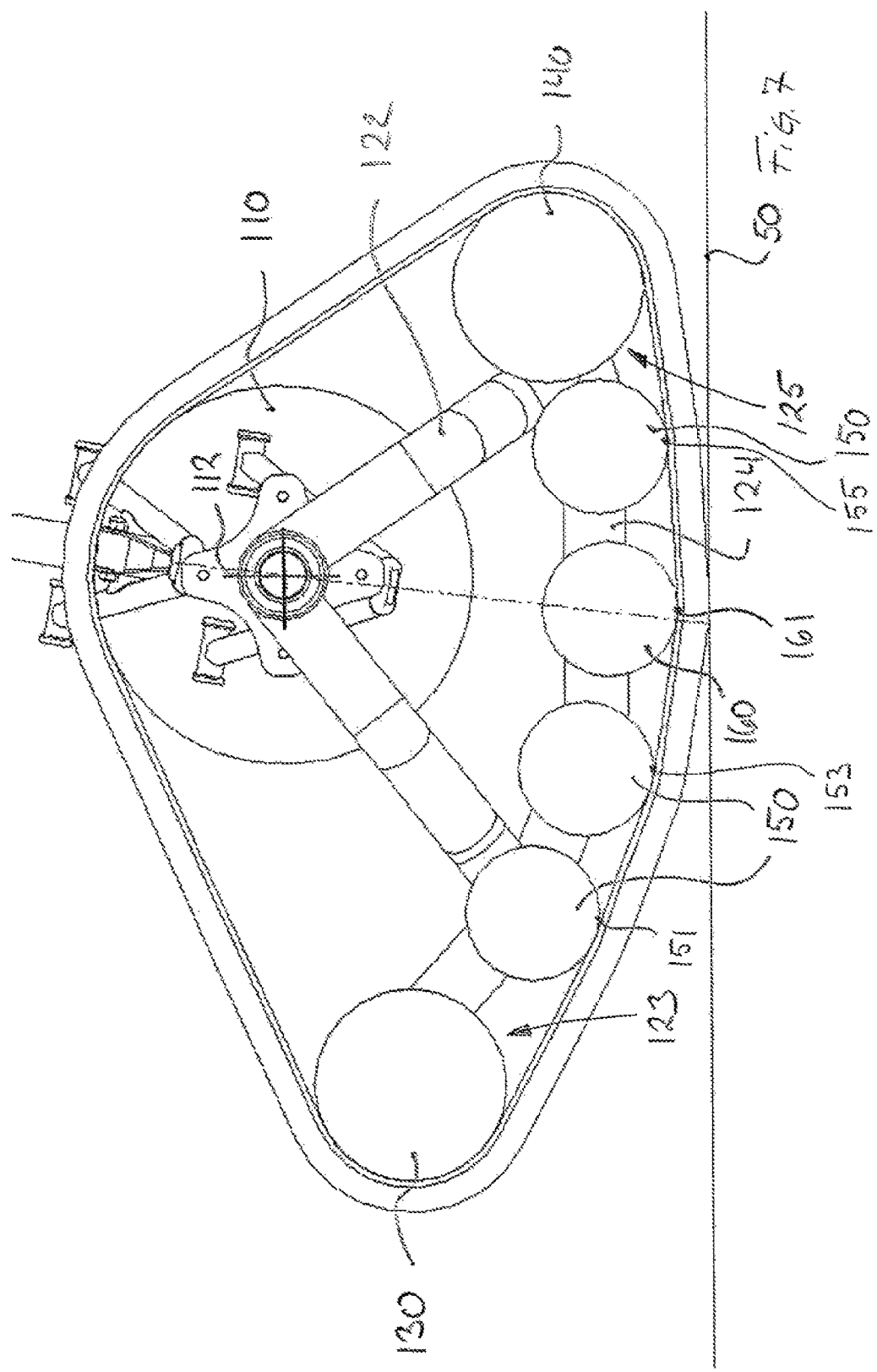

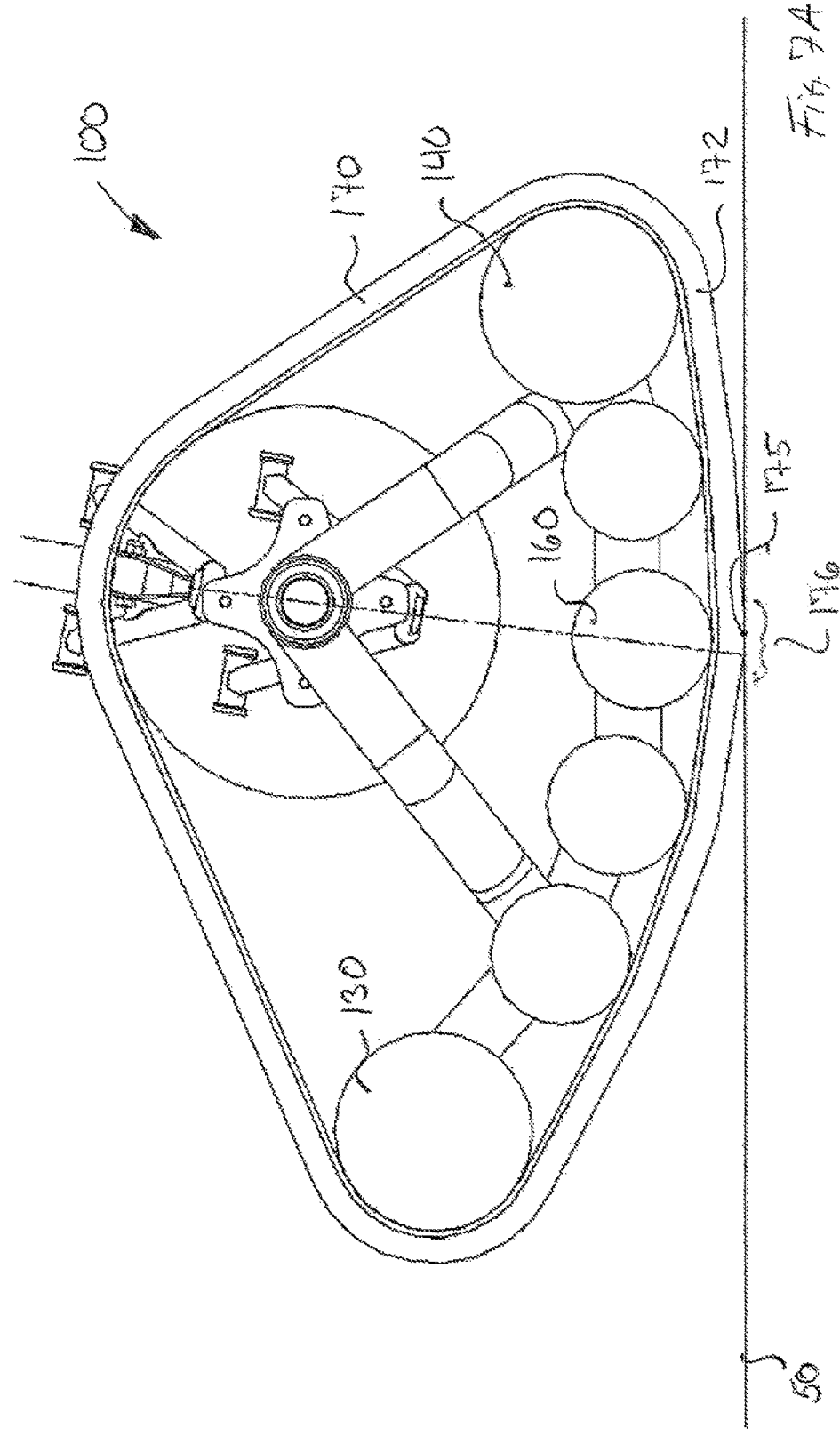

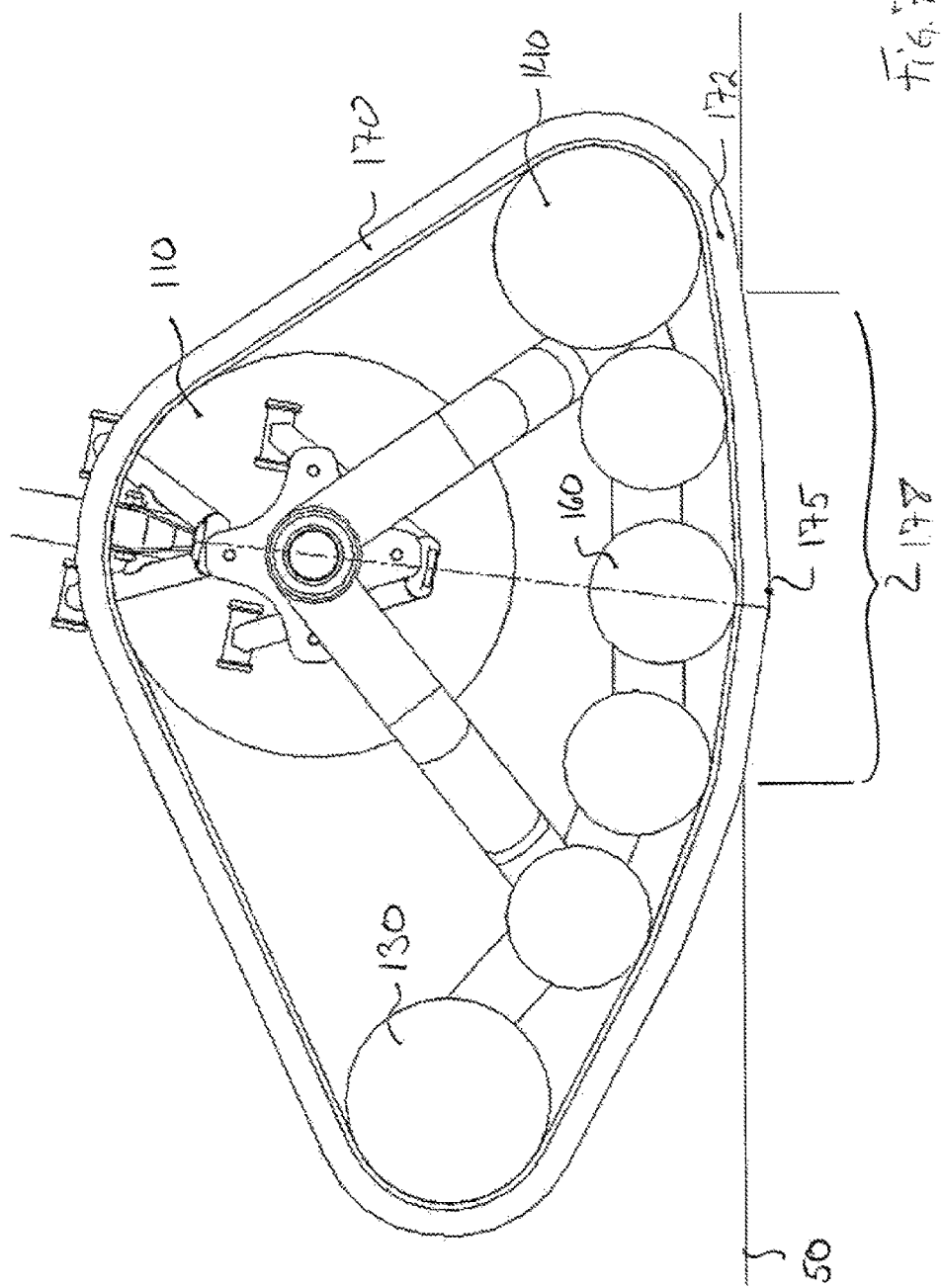

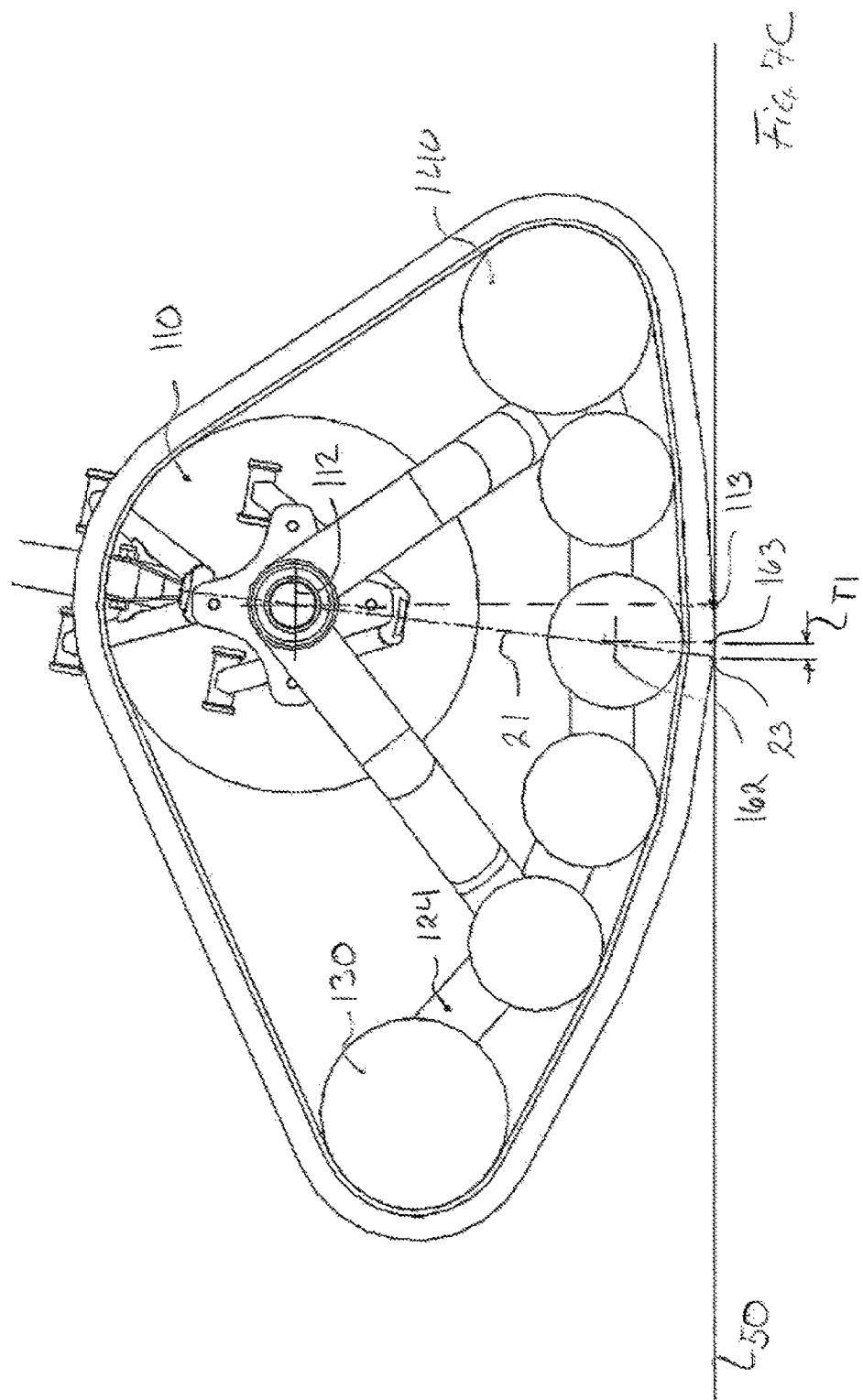

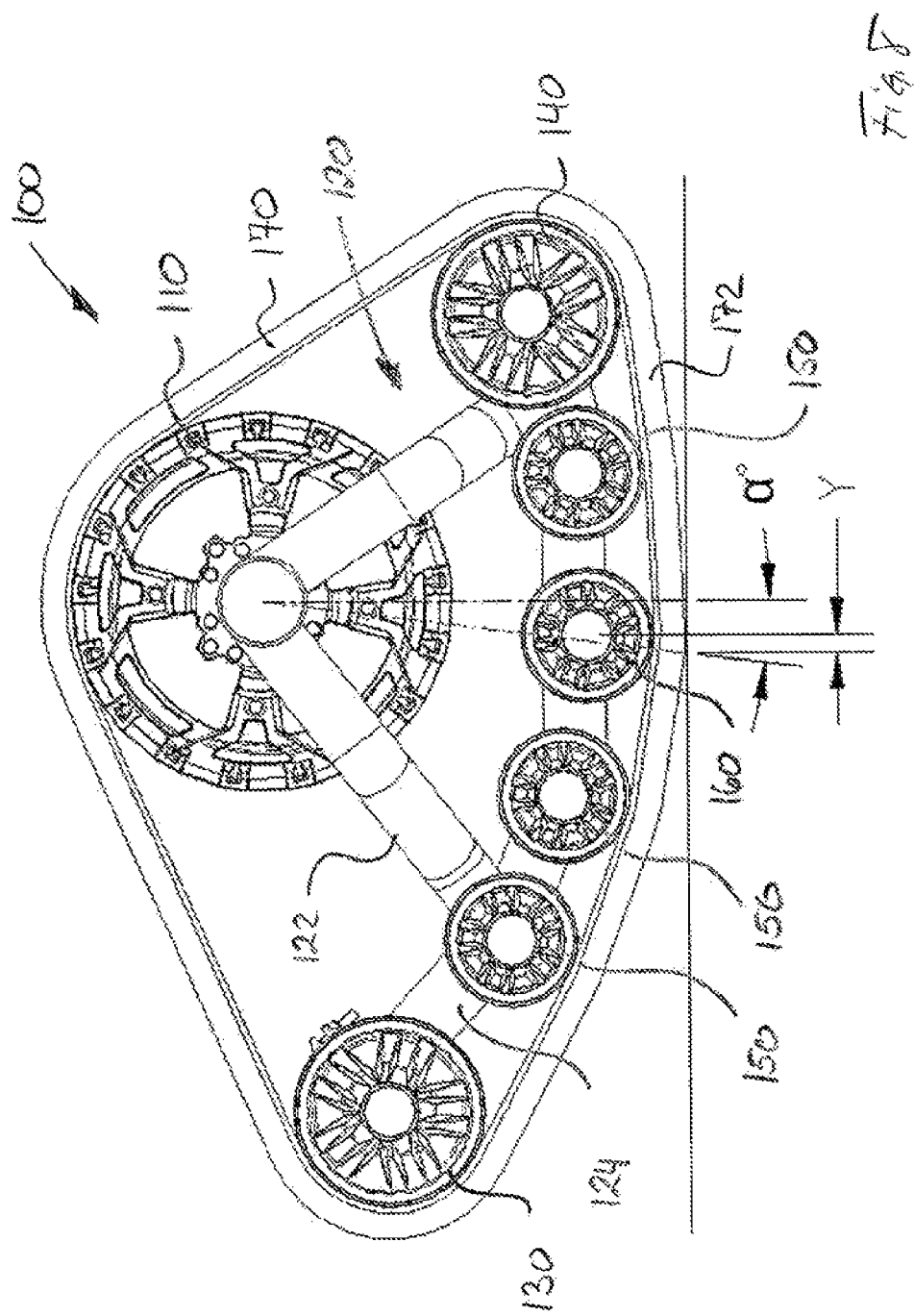

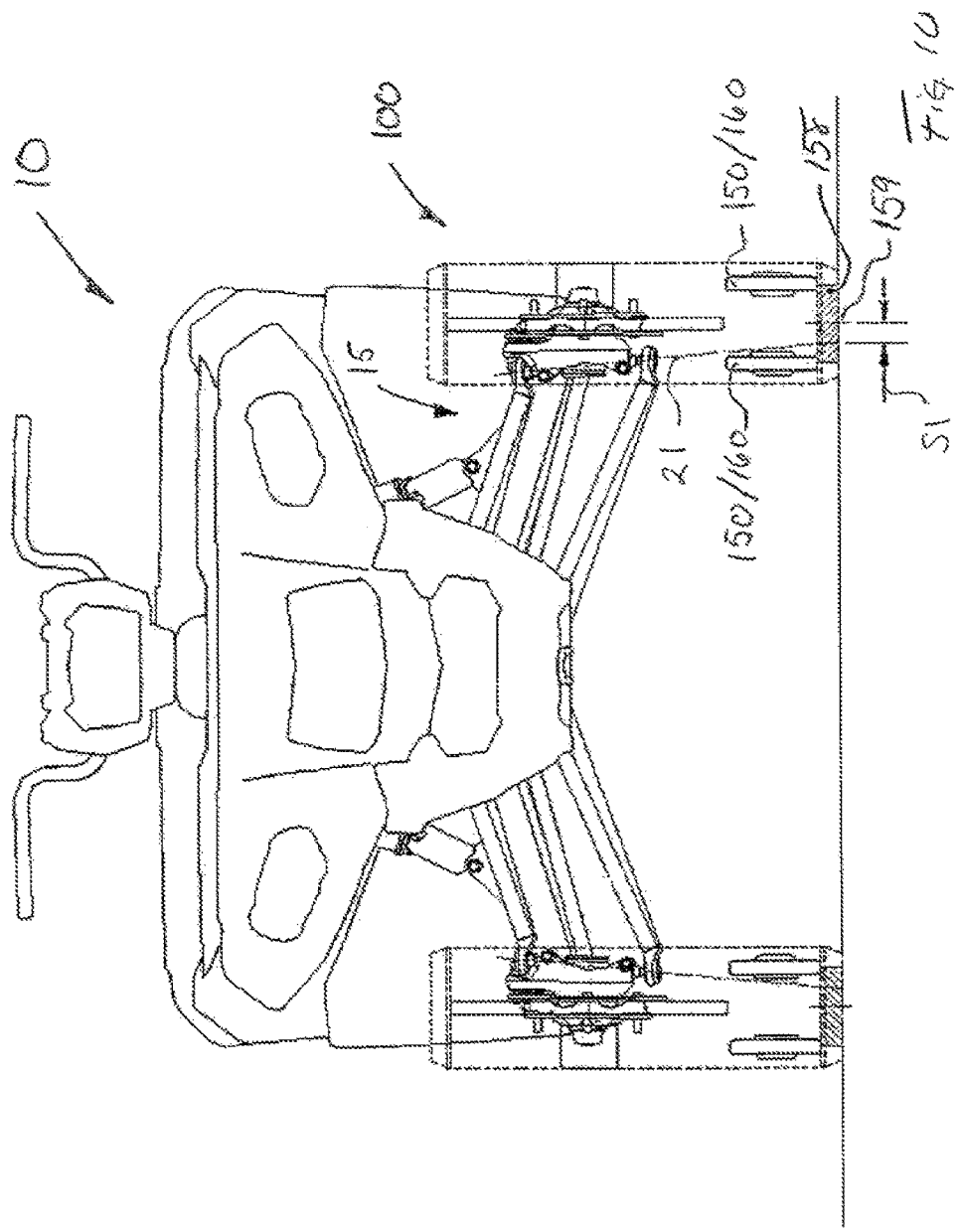

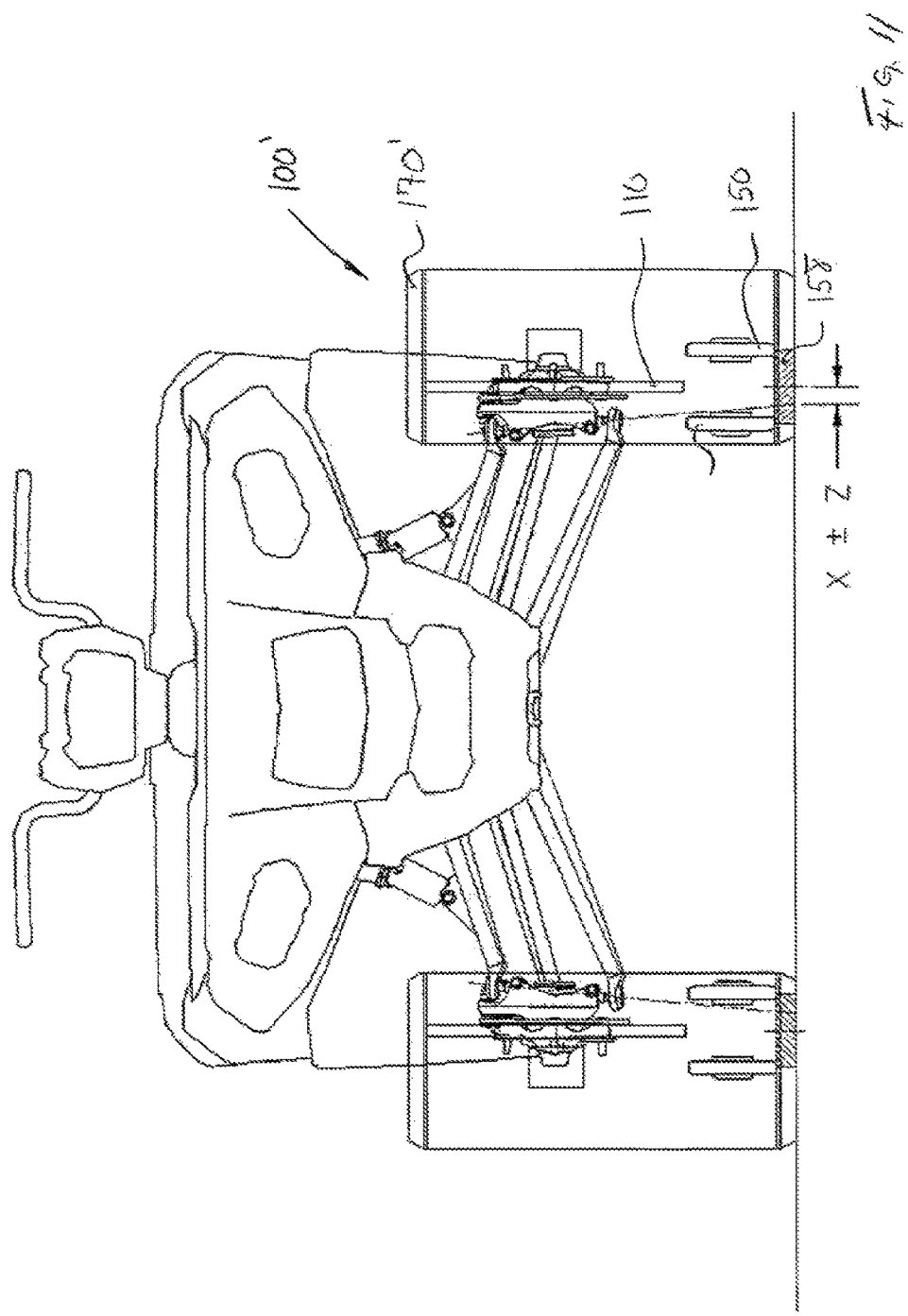

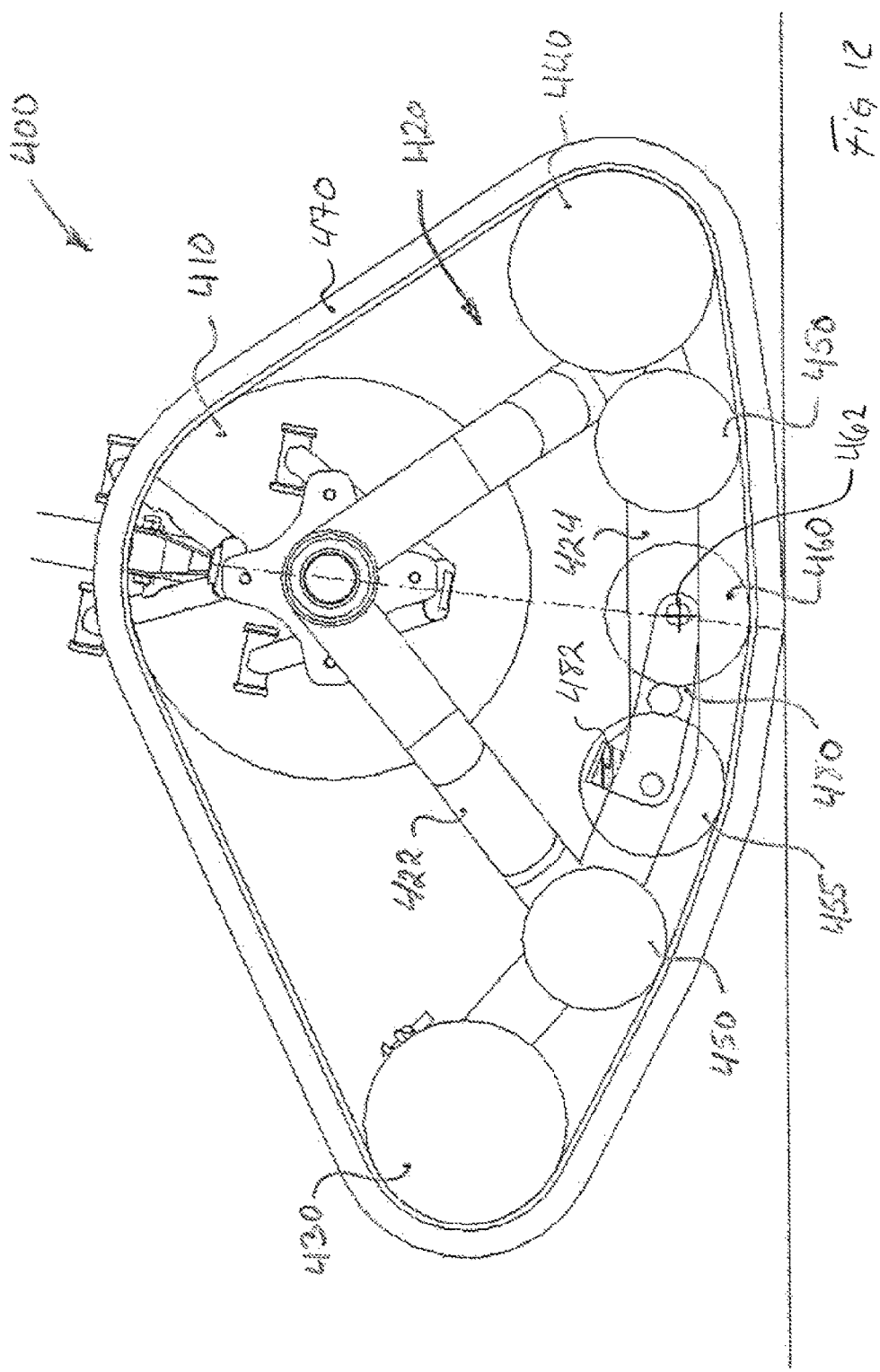

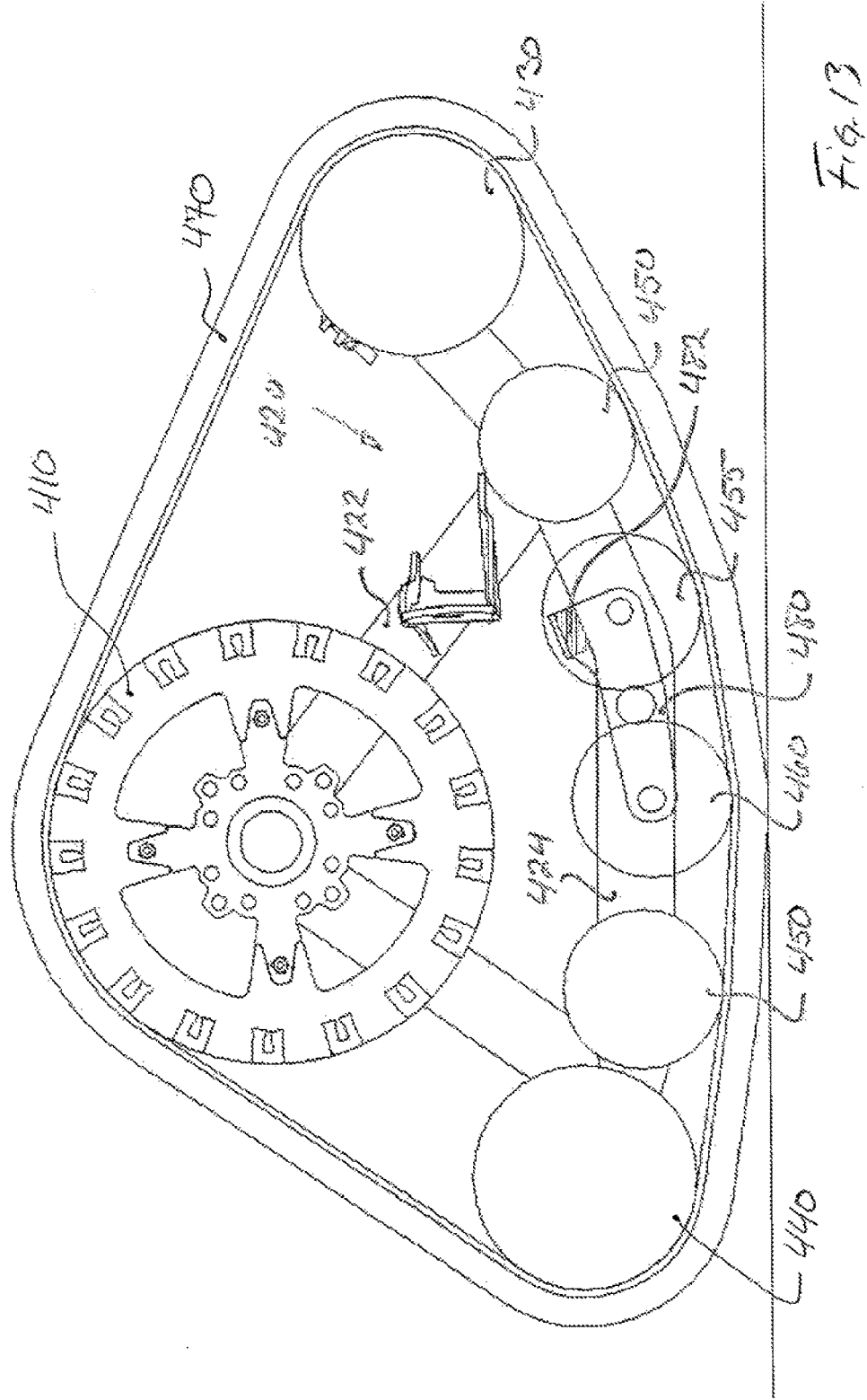

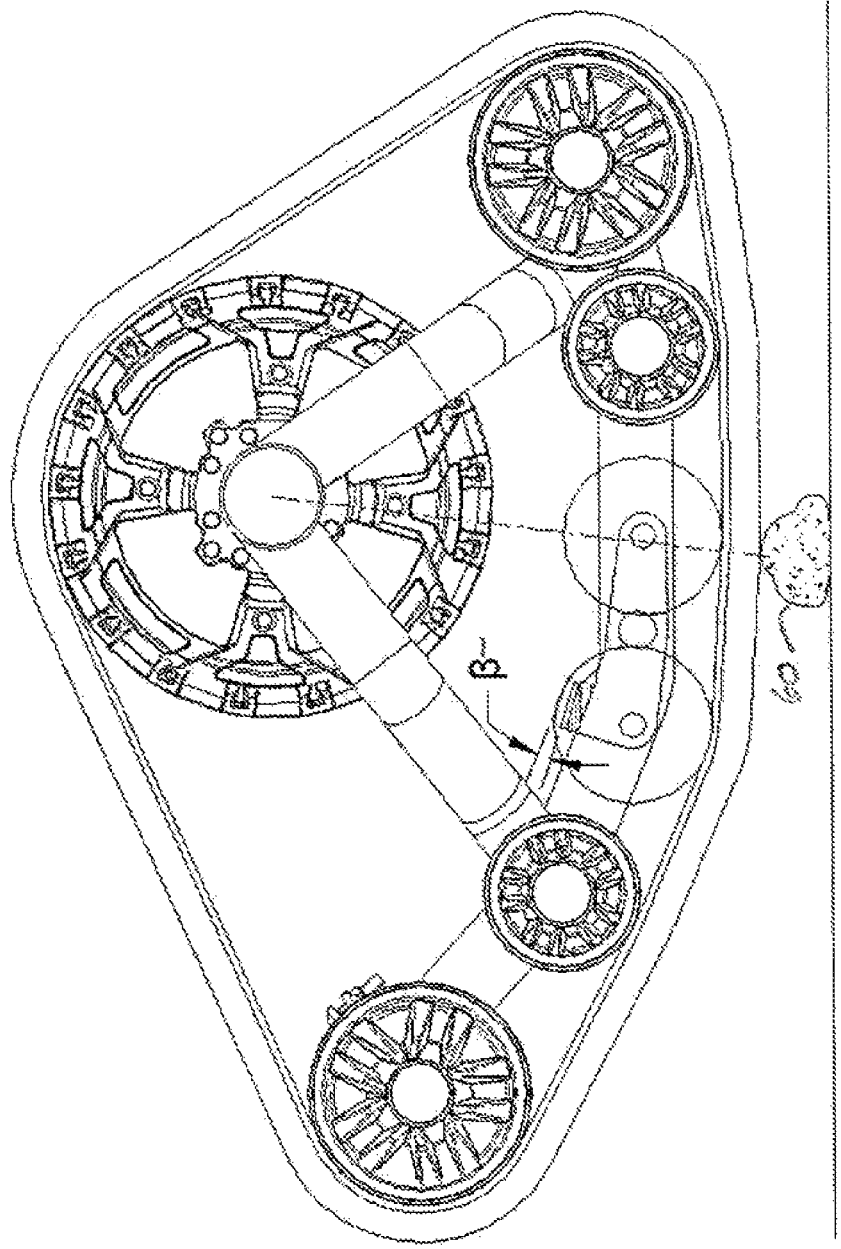

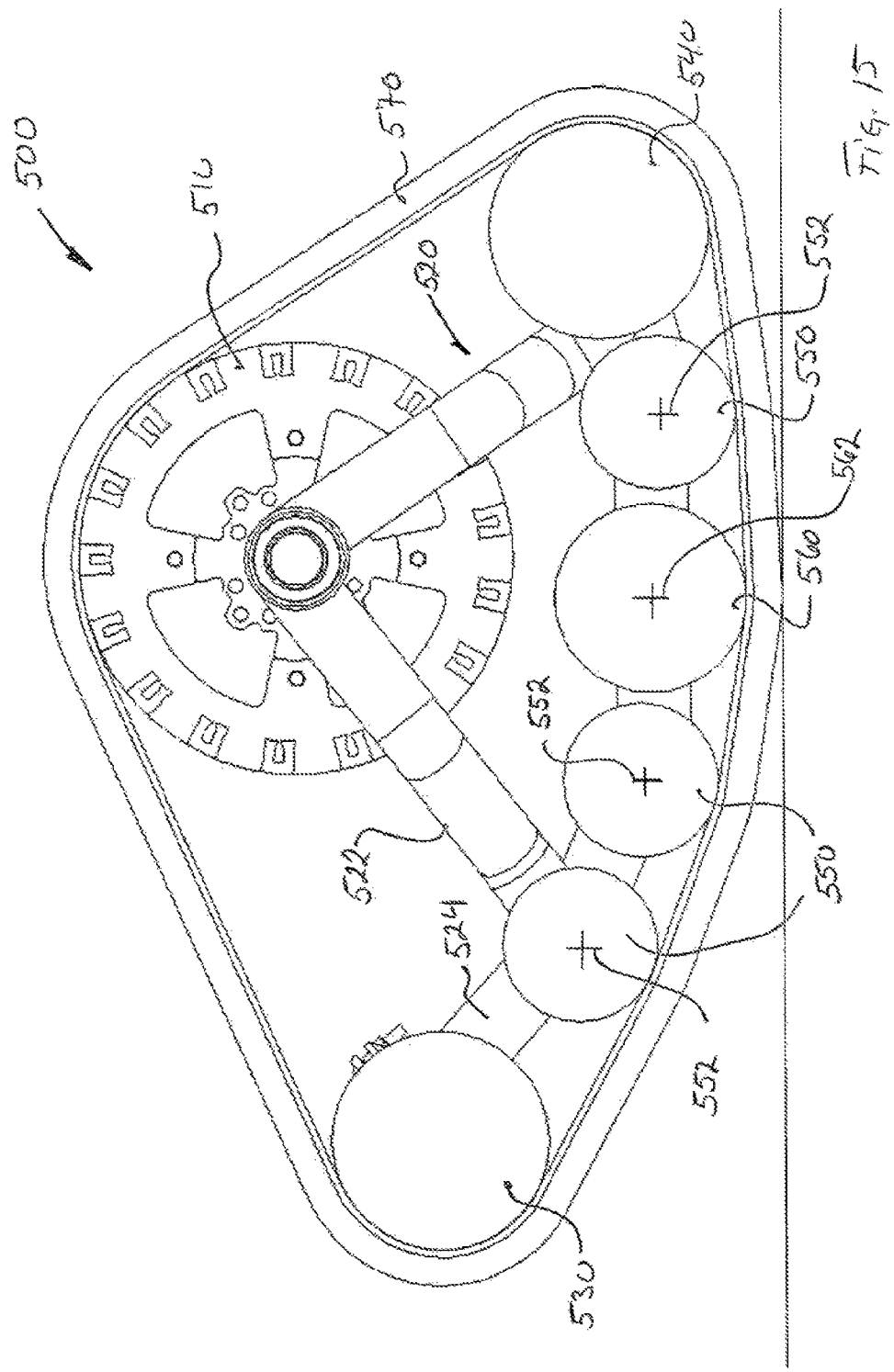

TRACK SYSTEM

CROSS-REFERENCE TO RELATED APPLICATIONS

The present patent application claims the benefits of priority of Canadian Patent Application No. 2,887,839, entitled "Track System", and filed at the Canadian Intellectual Property Office on Apr. 16, 2015, the content of which is incorporated herein by reference.

FIELD OF THE INVENTION

The present invention generally relates to track systems and traction assemblies generally used as wheel replacement on normally wheeled vehicles. The present invention more particularly relates to track systems and traction assemblies generally used as wheel replacement on small normally wheeled vehicles such as, but not limited to, all-terrain vehicles (ATVs), utility-terrain vehicles (UTVs), and side-by-side vehicles (SSV).

BACKGROUND OF THE INVENTION

Several wheeled vehicles and particularly light wheeled vehicles (e.g. ATVs, UTVs, SSVs, etc.) often have their wheels replaced by track systems which use an endless traction band instead of a tire for propulsion. Vehicles equipped with such track systems typically have improved floatation and better traction, particularly when they are operated over soft and/or rough terrains.

The improved floatation and traction are generally due to the larger ground-contacting area of the traction band. This larger ground-contacting area, commonly referred to as contact patch, effectively spreads the weight of the vehicle over a larger area (i.e. increased floatation) and provides additional ground-engaging surface to the vehicle (i.e. increased traction).

However, track systems are not without their shortcomings. Though the larger contact patch of the traction band is generally a significant advantage when the vehicle is operated over soft terrains (e.g. snow, mud, sand, etc.), the larger contact patch can become a hindrance when the vehicle is operated over harder surfaces (e.g. packed dirt, concrete, asphalt, pavement, etc.). Indeed, the larger contact patch generally implies more friction between the traction band and the ground, making the vehicle more difficult to steer and manoeuvre and ultimately negatively affecting its steering when operated over hard surfaces.

There have been attempts in the past to improve the handling of vehicles equipped with track systems when operated over harder surfaces. For instance, in U.S. Pat. No. 8,007,058, the track system comprises a traction band which outer ground-engaging lugs are particularly configured to define a smaller contact patch when operated on hard surfaces and a larger contact patch when operated on soft surfaces.

However, despite some attempts to improve the steering of vehicles equipped with track systems when these vehicles are operated over harder surfaces, there is still a need for an improved track system which will at least mitigate some shortcomings of prior art track systems.

SUMMARY OF THE INVENTION

A track system in accordance with the principles of the present invention generally mitigates at least some shortcomings of prior art track systems by having a particular road wheels configuration which causes the traction band to define a smaller contact patch when the track system is operated over hard surfaces and a larger contact patch when the track system is operated over soft surfaces.

A track system in accordance with the principles of the present invention is generally configured to replace a steerable wheel on a normally wheeled vehicle.

The track system generally comprises a drive wheel (e.g. a sprocket wheel) configured to be mounted to the vehicle, typically to the wheel hub where a wheel was previously mounted, a support frame (or support frame assembly) mounted to the drive wheel or mountable to the vehicle, front and rear idler wheels respectively pivotally mounted at the front end and at the rear end of the support frame, road wheels pivotally mounted to the support frame along its length, and an endless traction band disposed about the wheels and configured to be driven by the drive wheel.

According to a first broad aspect, one set of road wheels, in a widthwise direction of the track system, extends vertically lower than all the other road wheels when the track system in on a horizontal surface.

With such a road wheel configuration, when the track system is operated over hard surfaces (e.g. packed dirt, pavement, concrete, etc.), only the portion of the traction band located underneath the lower extending road wheels will effectively engage the ground. Indeed, due to the hardness of the ground surface, the portion of the traction band located underneath the lower extending road wheels will not sink into the ground. This ground-engaging portion of the traction band will thus define a relatively small contact patch, thereby making the track system easier to steer and manoeuvre over hard surfaces.

However, when the track system is operated over soft surfaces (e.g. snow, mud, sand, etc.), a larger portion of the traction band will effectively engage the ground, that is a portion larger than the portion located underneath the lower extending road wheels, as the latter will partially sink into the softer ground surface. This larger ground-engaging portion of the traction band will define a relatively larger contact patch, thereby improving the floatation and traction of the vehicle when operated over soft surfaces.

Hence, the lower extending road wheels generally reduce the size of the contact patch of the track system to the area of the traction band located underneath the lower extending road wheels when the vehicle is operated over hard surfaces (e.g. packed dirt, pavement, concrete, etc.). By having a smaller contact patch over hard surfaces, the track system becomes easier to steer and manoeuvre over such surfaces. However, the lower extending road wheels do not significantly reduce the size of the contact patch when the track system is operated over soft surfaces, thereby maintaining the benefits (e.g. improved floatation and traction) of the track system over such softer surfaces.

In typical yet non-limitative embodiments, the rotation axis of the lower extending road wheels is located behind, in a longitudinal direction, the point of intersection of the steering axis of the steering assembly of the vehicle with the ground surface. In such embodiments, the rotation axis of the lower extending road wheels is also located, still in a longitudinal direction, in front of the rotation axis of the drive wheel.

In some typical yet non-limitative embodiments, the lower extending road wheels are positioned on the support frame such that the rotation axis of these road wheels is lower than the rotation axes of all the other road wheels.

In some non-limiting embodiments, the set of lower extending road wheels is coupled with another set of road wheels on a tandem support frame pivotally mounted to the support frame to allow downward and generally limited upward movements of the lower extending road wheels during operation of the track system.

In some typical yet non-limitative embodiments, the lower extending road wheels have a larger diameter than the other road wheels.

According to a second broad aspect, the track system is configured such that the steering axis of the steering assembly of the vehicle, to which the track system is mounted, intersects the laterally extending area located between the road wheels.

In some typical yet non-limitative embodiments, the lateral distance between the point of intersection of the steering axis and the ground, and the center of the area between the road wheels, sometimes referred to as the scrub radius, is minimized.

By reducing the scrub radius of the track system, the track system becomes easier to steer and manoeuvre over hard surfaces.

Understandably, though each one of the lower extending road wheels and the reduction in scrub radius individually contributes to improving the steering and manoeuvrability of vehicle equipped with track systems in accordance with the principles of the present invention, it remains that the combination of both greatly enhances the steering and manoeuvrability of the vehicle equipped with such steerable track systems, particularly when such vehicle is operated over hard surfaces (e.g. packed dirt, pavement, concrete, etc.).

Still, the lower extending road wheels and the reduction in scrub radius do not reduce the benefits of track systems when operated over soft surfaces, which are better floatation and traction.

According to an aspect of the present invention the track system for a vehicle comprises
   a. a sprocket wheel configured to be mounted to the vehicle,
   b. a support frame adapted to be mounted to the sprocket wheel and/or to the vehicle,
   c. front and rear idler wheels pivotally mounted to the support frame,
   d. a plurality of road wheels pivotally mounted to the support frame and
   e. an endless traction band disposed about the sprocket wheel, the idler wheels and the road wheels,
      wherein one of said road wheels extends vertically lower than the other road wheels when the track system in on a horizontal surface;
      whereby, in use, when the track system is operated over a hard surface, only a portion of the traction band located underneath the lower road wheel will effectively engage the ground.

The track system for a vehicle may further have the lower road wheels arranged in a pair of aligned lower road wheels located vertically at the same height.

According to an aspect of the invention, the track system for a vehicle as claimed has a longitudinal distance T1 is measured horizontally at the ground level, between a first axis defined by the steering axis and a transverse plane projecting to the ground from the center of rotation of the lower road wheel, and a lateral distance S1 is measured horizontally at the ground level, between the first axis and a longitudinal plane defined laterally midway between the pair of lower road wheels, with the longitudinal distance T1 being between 5 mm and 35 mm, and the lateral distance S1 being between −25 mm and 25 mm to optimize the steerability of the vehicle.

According to an aspect of the invention, the track system has a pair of lower road wheels positioned on a lower portion of the support frame such that an axis projecting from the point of rotation of the lower road wheel to the ground at the ground surface is longitudinally located rearward of the point of intersection of the steering axis with the ground surface.

According to an aspect of the invention, the track system has lower road wheels have with a diameter larger than the diameter of the other road wheels.

According to an aspect of the invention, the track system is configured such that a vertical plane centered between the pair of lower road wheels is laterally offset from the longitudinal center of the endless traction band.

According to an aspect of the invention, the track system may further comprise a tandem frame pivotally mounted to a lower portion of the support frame, having the lower road wheels being pivotally mounted to the tandem frame, the tandem frame allowing changing the height of the wheel. The tandem frame may also be configured such that the amplitude of a downward movement of the lower road wheels is larger than the amplitude of an upward movement. Accordingly, the upward movement of the lower road wheel may be limited by a limiter located either about the lower frame portion or about the tandem frame.

According to an aspect of the invention, the track system is configured such that the steering axis intersects an area of the endless traction band, the area being defined longitudinally by its contact with the ground surface when on an horizontal surface and laterally by the central vertical axis of the of road wheels.

According to an aspect of the invention, the track system the area of contact of the endless traction band substantially varies in function of a hardness of the ground surface, wherein in soft ground surfaces the apex of the traction band sinks into the ground surface allowing a larger portion of the portion of the traction band located underneath the lower road wheel to engage the ground.

According to an aspect of the invention, the pair of lower road wheels of the track system may be longitudinally located about the steering axis and all road wheels may be in pairs. According to another aspect of the invention, the track system comprises three pairs of road wheels.

According to an aspect of the invention, the track system may have the pair of road wheels mounted to the support frame such that the rotation axes of the lower road wheels is lower than the rotation axes of all the other road wheels.

According to an aspect of the invention, the track system may be configured such that the steering axis intersect an area between the pair of lower road wheels in its center to facilitate the steering of the vehicle.

According to an aspect of the present invention the track system for a vehicle comprises:
   a. a sprocket wheel configured to be mounted to the vehicle,
   b. a support frame adapted to be mounted to the sprocket wheel and/or to the vehicle,
   c. front and rear idler wheels pivotally mounted to the support frame,
   d. a plurality of road wheels pivotally mounted to the support frame and
   e. an endless traction band disposed about the sprocket wheel, the idler wheels and the road wheels, wherein at least a pair of road wheels are located longitudinally about the steering axis;

wherein a longitudinal distance T1 is measured horizontally at the ground level, between a first axis defined by the steering axis and a transverse plane projecting to the ground from the center of rotation of the pair of road wheels located about the steering axis;

wherein a lateral distance S1 is measured horizontally at the ground level, between the first axis and a longitudinal plane defined laterally midway between the pair of road wheels located about the steering axis;

wherein the longitudinal distance T1 being between 5 mm and 35 mm, and the lateral distance S1 being between −25 mm and 25 mm to optimize the steerability of the vehicle.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 6 is a side view of the front portion of the vehicle of FIG. 4.

FIGS. 7 and 7A-7C are side views of the front left track system of the vehicle of FIG. 4.

FIG. 8 is another side view of the front left track system of the vehicle of FIG. 4.

FIG. 10 is a front view of the vehicle of FIG. 4.

FIG. 11 is a front view of the vehicle of FIG. 4, the vehicle being equipped with another embodiment of front track systems in accordance with the principles of the present invention.

FIG. 12 is a side view of another embodiment of a track system in accordance with the principles of the present invention.

FIG. 13 is an internal side view of the track system of FIG. 12.

FIG. 15 is a side view of yet another embodiment of a track system in accordance with the principles of the present invention.

FIG. 16 is an internal side view of the track system of FIG. 15.

DETAILED DESCRIPTION OF THE PREFERRED EMBODIMENT

A novel track system will be described hereinafter. Although the invention is described in terms of specific illustrative embodiments, it is to be understood that the embodiments described herein are by way of example only and that the scope of the invention is not intended to be limited thereby.

Figure 1:
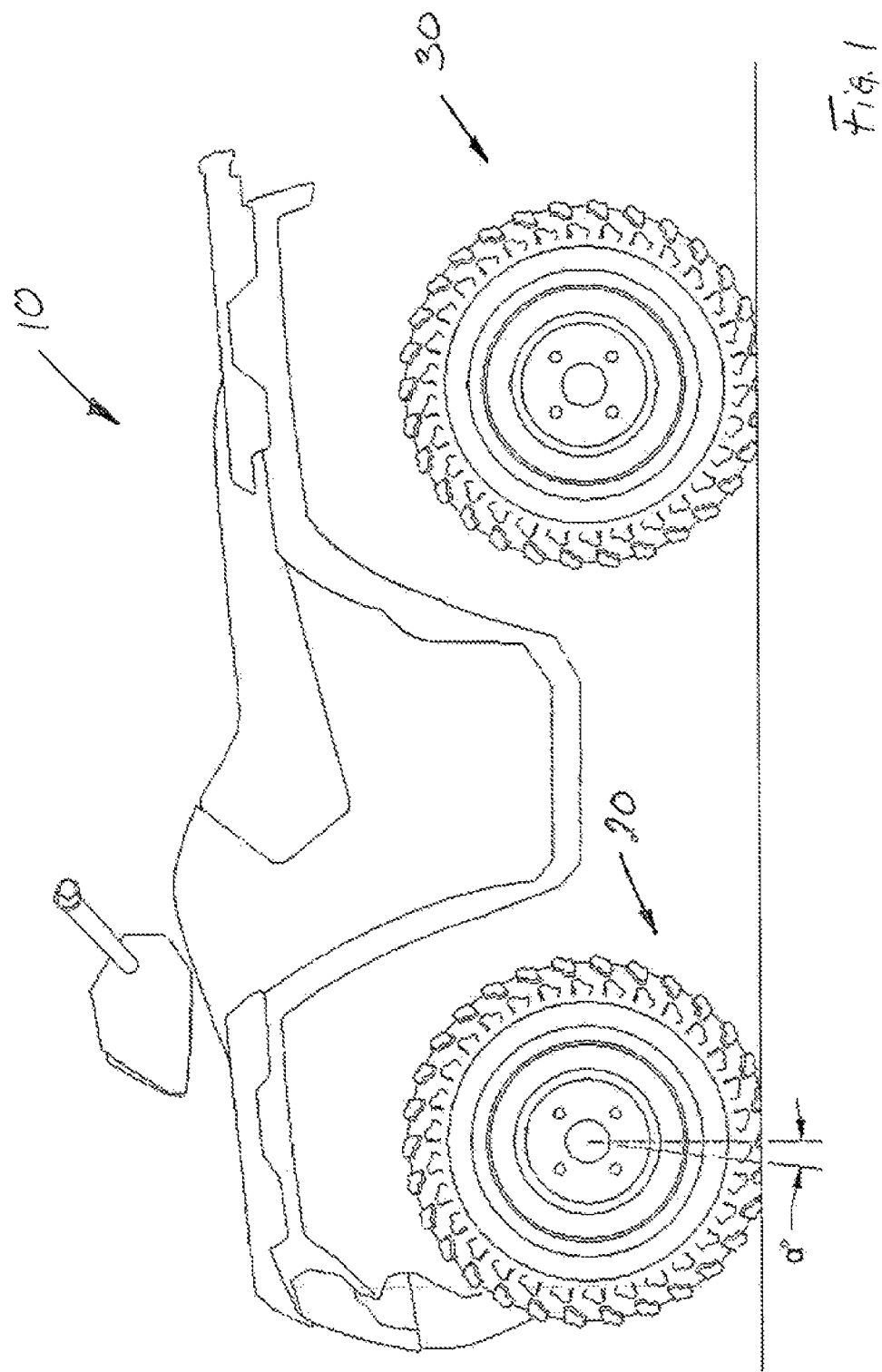
FIG. 1 is a side view of an exemplary wheeled vehicle (ATV).
Figure 3:
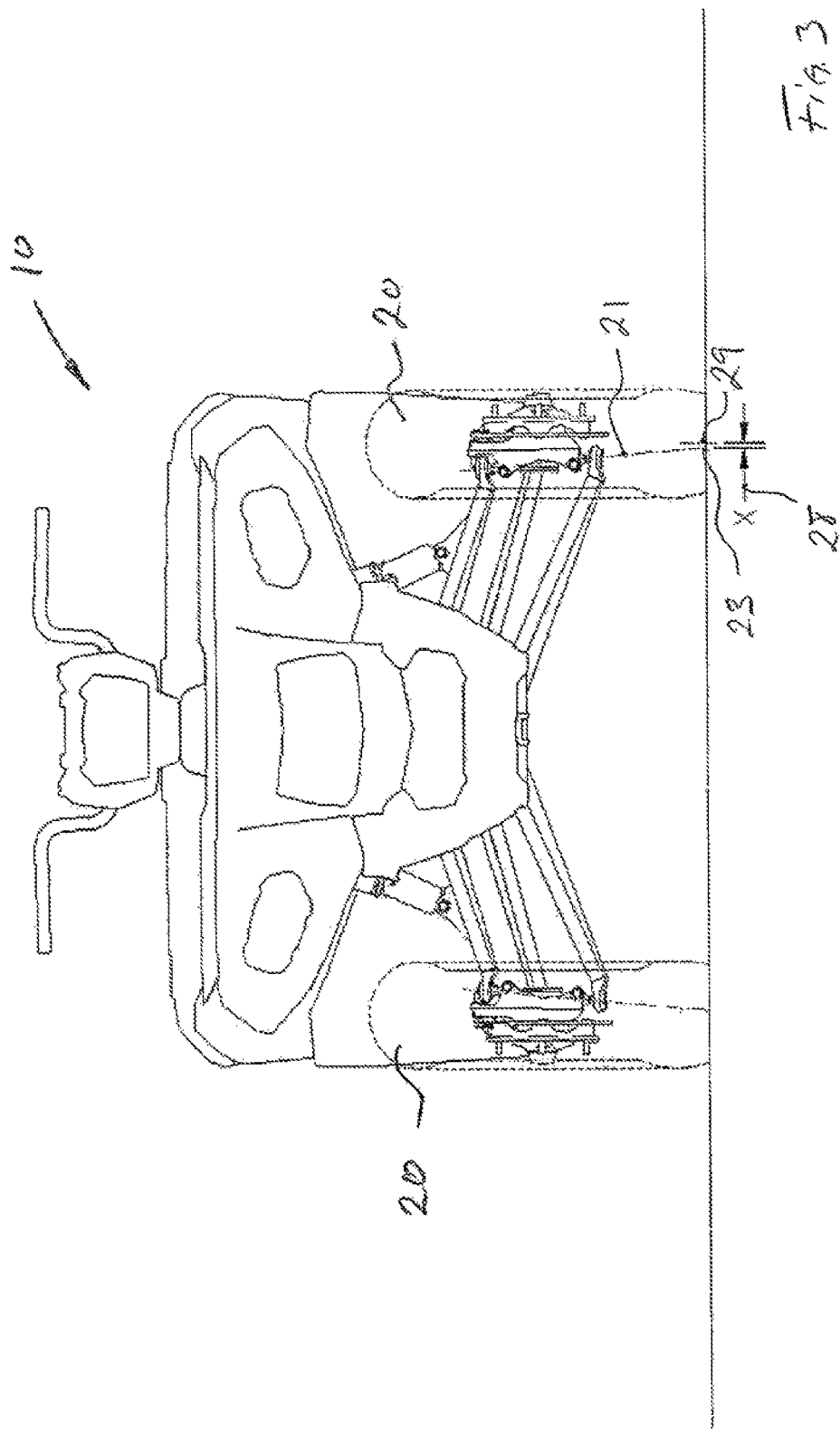
FIG. 3 is a front view of the vehicle of FIG. 1, with the front wheels and tires in phantom lines.

Referring first to FIGS. 1 and 3, a conventional wheeled vehicle 10 is depicted. In FIGS. 1 and 3, the vehicle is an all-terrain vehicle (ATV) 10 equipped with four wheels, two front steerable wheels 20 and two rear wheels 30.

Figure 2:
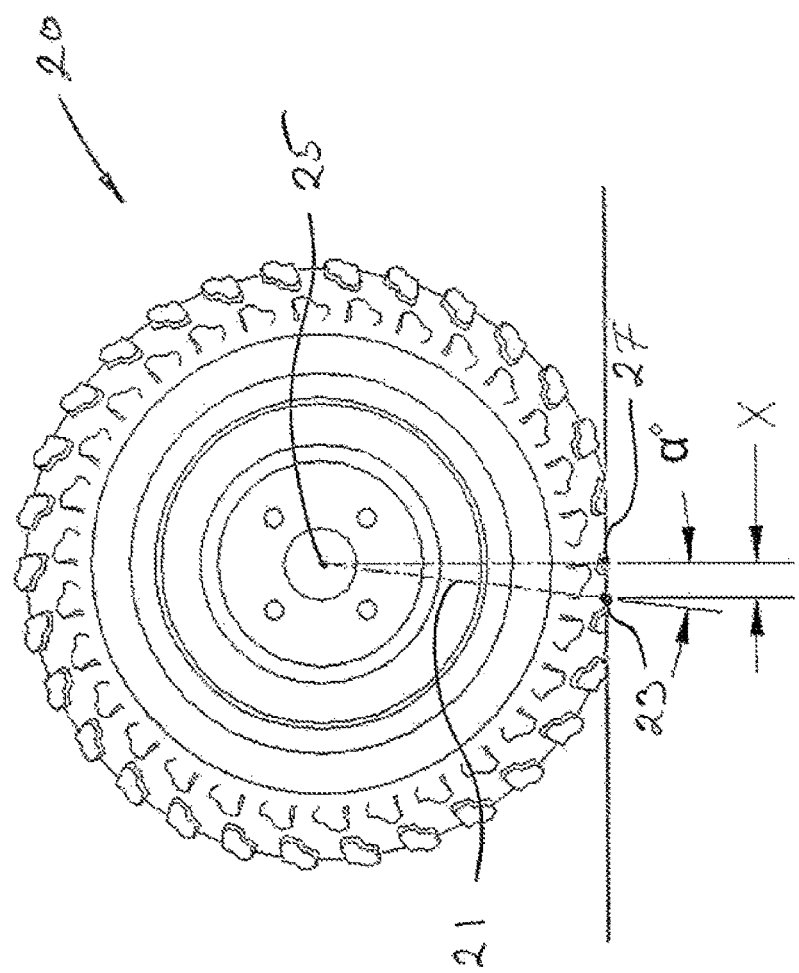
FIG. 2 is an enlarged fragmentary side view of the front left wheel of the vehicle of FIG. 1.

As best shown in FIGS. 1 and 2, the steerable front wheels 20 of the vehicle 10 exhibit a positive trail configuration. More particularly, the point of intersection 23 of the steering axis 21 is located longitudinally in front of the vertical projection on the ground 27 of the rotation axis 25 of the wheel 20. Such a configuration is generally referred to as positive trail. Wheels having a positive-trail configuration are more stable when the vehicle is moving in straight line at high speed.

Understandably, if the point of intersection 23 of the steering axis 21 was located longitudinally behind of the vertical projection on the ground 27 of the rotation axis 25 of the wheel 20, the configuration would be referred to as negative trail.

Referring now to FIG. 3, the steerable front wheels 20 of the vehicle 10 exhibit a small scrub radius. More particularly, the lateral distance 28 between the point of intersection 23 of the steering axis 21 and the center point 29 of the contact patch of the wheel 20, is small. Having smaller scrub radius is generally preferable as it makes the wheels 20 easier to steer by generally reducing the amount of friction between the wheels 20 and the ground.

Figure 4:
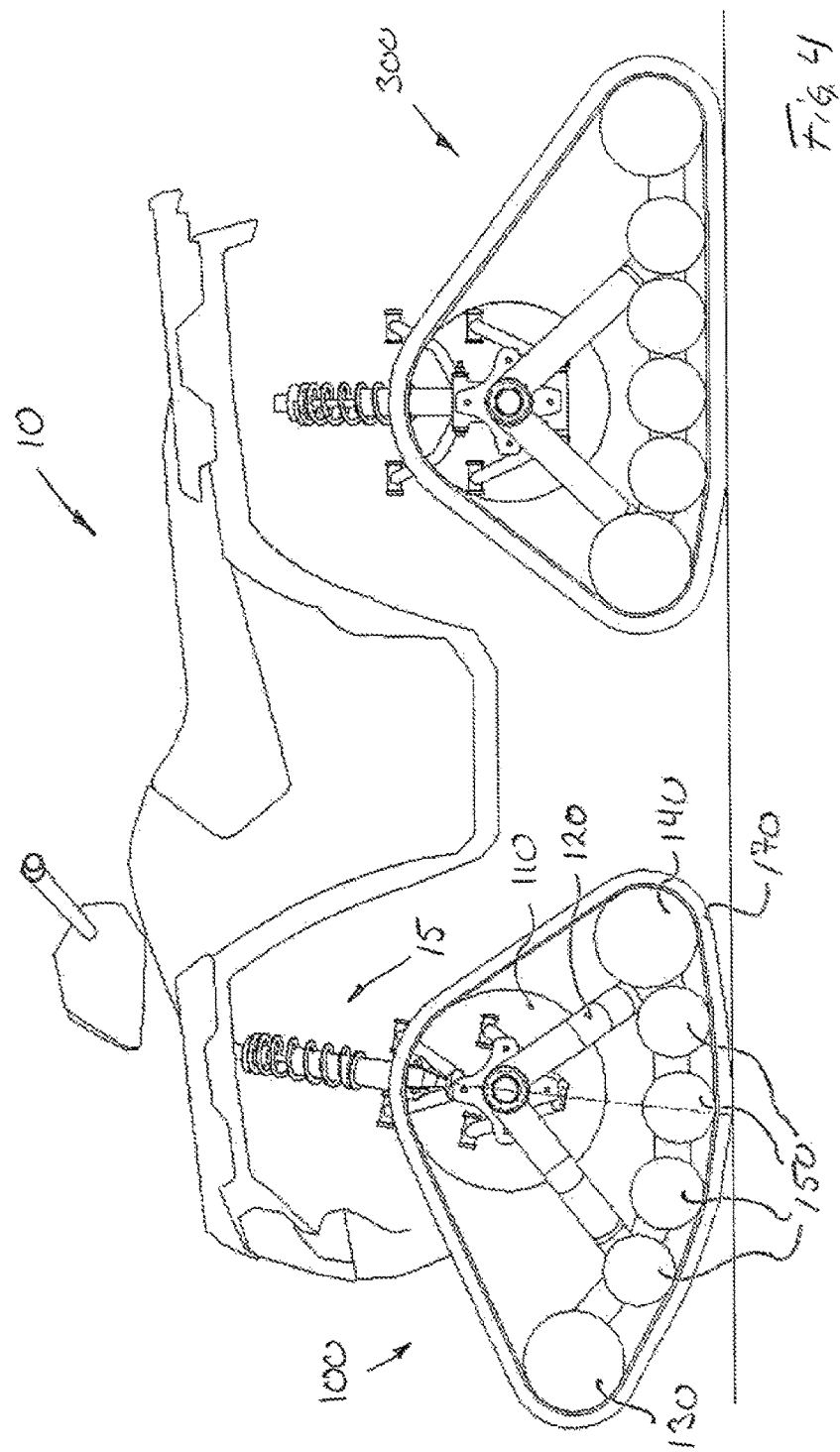
FIG. 4 is a side view of an exemplary vehicle (ATV) equipped with front and rear track systems, the front track systems being in accordance with the principles of the present invention.
Figure 5:
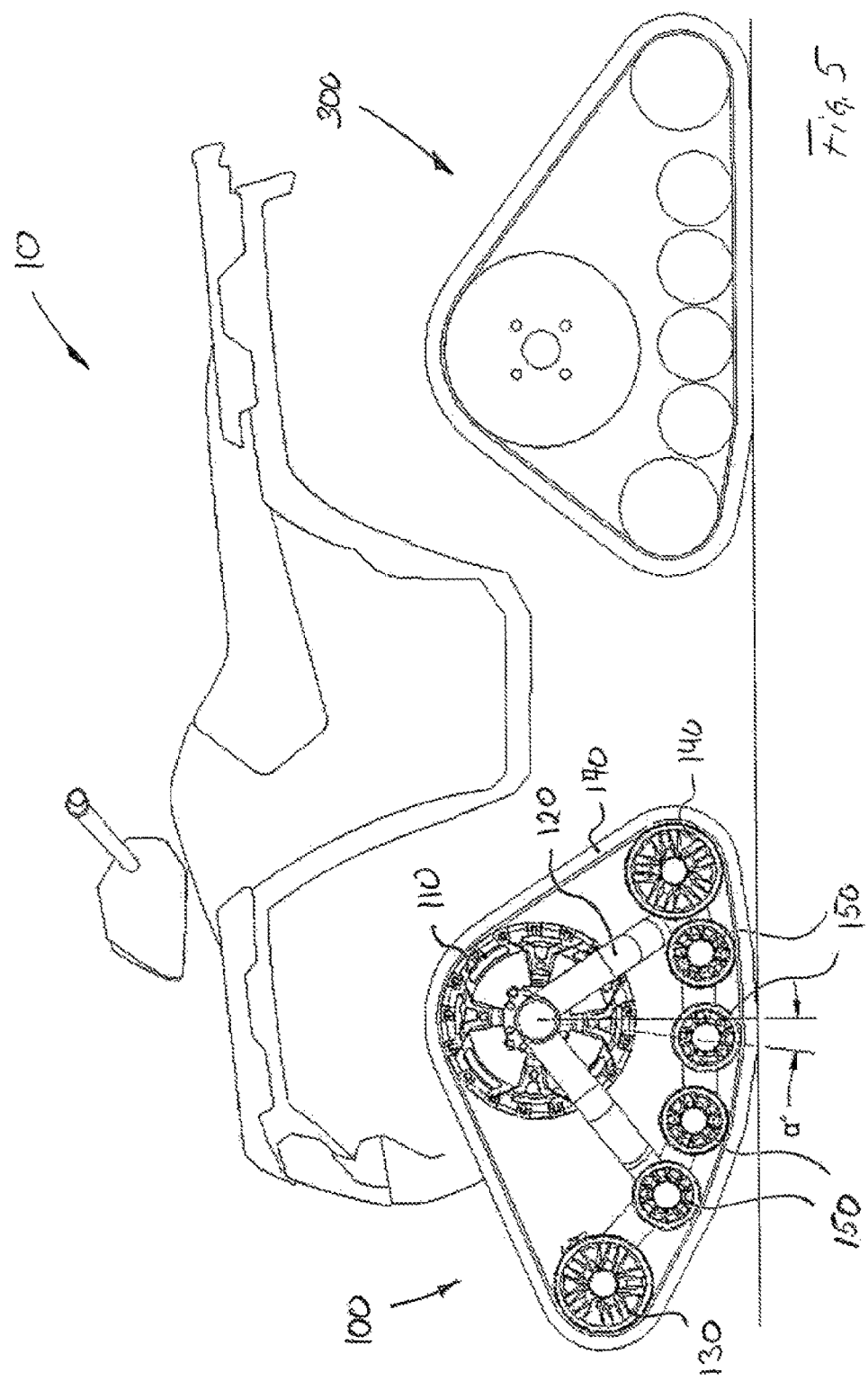
FIG. 5 is another side view of the vehicle of FIG. 4.

Referring now to FIGS. 4 and 5, the vehicle 10 is depicted with four track systems (only the left ones are visible), two front track systems 100 which replace the front steerable wheels 20 of the vehicle 10, and two rear track systems 300 which replace the rear wheels 30 of the vehicle 10. Notably, only track systems 100 are configured in accordance with the principles of the present invention.

Since the left and right track systems 100 are mirror image of each other, only the left track system 100, the one visible in FIGS. 4 and 5, will be described hereafter. It remains that the description applies equally to both front track systems 100.

Referring now to FIGS. 4 to 8, the track system 100 generally comprises a drive wheel 110 (e.g. a sprocket wheel) configured to be mounted to the wheel hub (not shown) of the vehicle 10, the wheel hub being mounted to the steering and suspension assembly 15 of the vehicle 10. The track system 100 also comprises a support frame 120, front and rear idler wheels 130 and 140, road wheels 150, and an endless traction band 170 disposed about the various wheels and configured to be drivingly entrained by the drive wheel 110.

In the present embodiment, the support frame 120 is pivotally yet non-drivingly mounted to the drive wheel 110. In such configuration, the support frame 120 is generally free to rotate about the rotation axis 112 of the drive wheel 110. The support frame 120 also generally comprises an upper frame portion 122 and a lower frame portion 124.

In other embodiments, the support frame 120 could be mounted directly to the vehicle 10 instead of to the drive wheel 110, for instance, to the steering and suspension assembly 15 of the vehicle 10.

Figure 9:
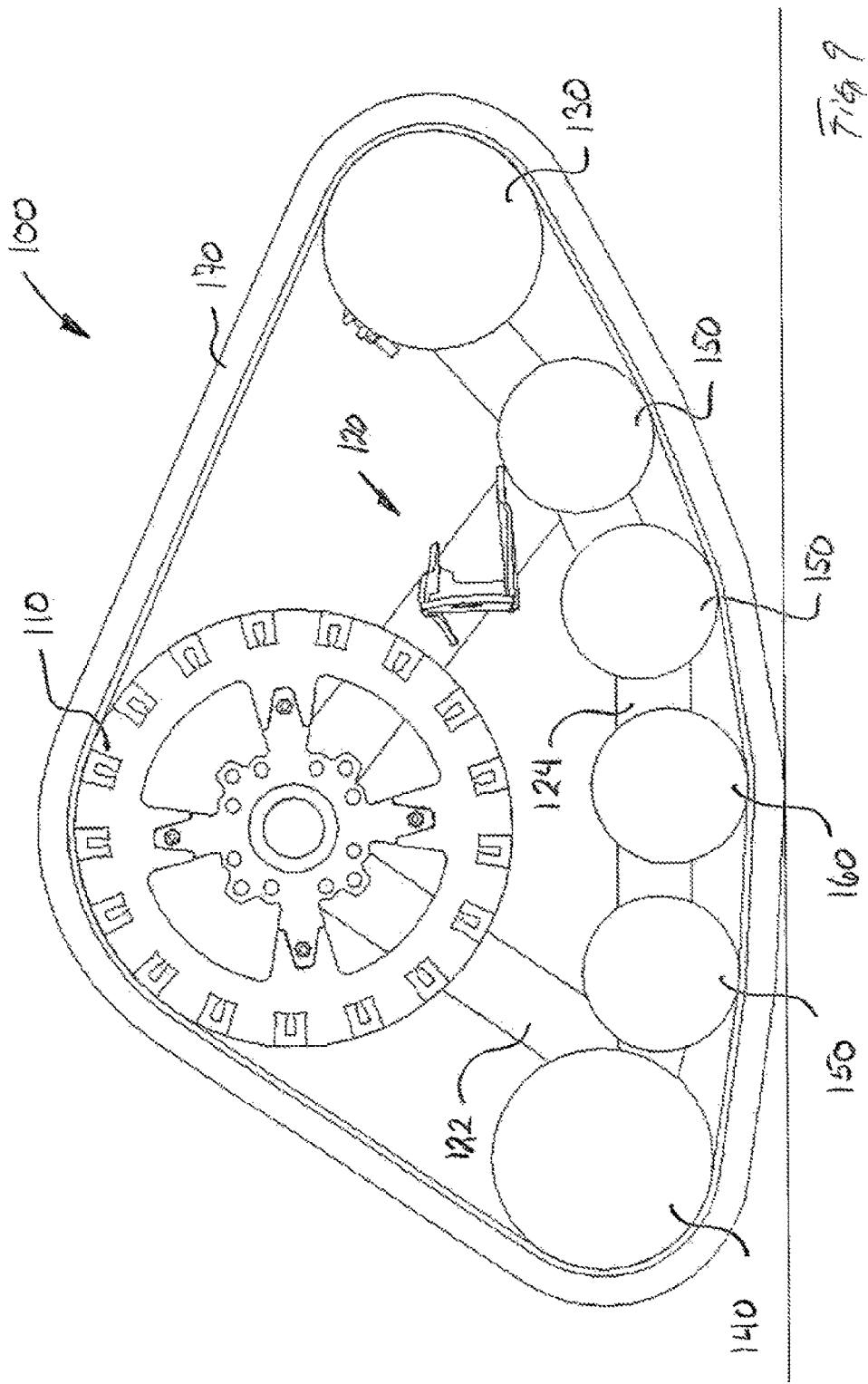
FIG. 9 is an internal side view of the front left track system of the vehicle of FIG. 4.

As best shown in FIG. 7, the front and rear idler wheels 130 and 140 are respectively pivotally mounted at the front extremity 123 and at the rear extremity 125 of the support frame 120, and more particularly of the lower frame portion 124 thereof. As for the road wheels 150, they are pivotally mounted along the length of the lower portion 124 of the support frame 120, typically on each side thereof (see also FIG. 9).

In the present embodiment, the traction band 170 is substantially made from reinforced elastomeric materials. The traction band 170 comprises a inner wheel-engaging surface 171 configured to be engaged positively or frictionally by the drive wheel 110, and an outer ground-engaging surface 173 configured to engage the ground surface over which the vehicle 10 is operated.

Referring now more particularly to FIG. 7, one set of road wheels 150, in a widthwise direction of the track system 100, now referred to as road wheels 160, extend vertically lower than all the other road wheels 150 when the track system 100 is on a horizontal surface 50. In other words, the lowest point 161 of road wheels 160 is lower than the lowest points 151, 153 and 155 of all the other road wheels 150.

As best shown in FIG. 7A, by having a set of lower extending road wheels 160, the lower run 172 of the traction band 170, that is the portion of the traction band 170 extending between the front and rear idler wheels 130 and 140 and generally facing the ground surface 50, defines a generally curved shape which apex 175 is located under the lower extending road wheels 160.

In that sense, when the vehicle 10 is operated over hard surfaces (e.g. packed dirt, concrete, pavement, etc.), only of the portion 176 of the lower run 172 of the traction band 170 located under the lower extending wheels 160 is in contact with the ground surface 50. This portion 176, which generally extends the full width of the traction band 170, defines the first or hard surface contact patch of the track system 100.

However, referring to FIG. 7B, when the track system 100 is operated over soft surfaces (e.g. soft, mud, sand, etc.), the apex 175 of the lower run 172 of the traction band 170 will sink into the ground surface 50, allowing a larger portion 178 of the lower run 172 to engage the ground. This larger portion 178, which also generally extends the full width of the traction band 170, generally defines the second or soft surface contact patch of the track system 100. Notably, the exact size of the larger portion 178 can vary depending on the softness of the ground surface. The softer the ground surface, the lower the track system will sink in.

Understandably, the hard surface contact patch is smaller than the soft surface contact patch. By having a smaller contact patch when operated over hard surfaces, the track system 100 is easier to steer over such surfaces. However, when operated over soft surfaces, the track system 100 still provides improved floatation and traction as the soft surface contact patch is larger.

Referring now to FIG. 7C, in the present embodiment, the lower extending road wheels 160 are positioned on the lower frame portion 124 such that the ground projection 163 of the rotation axis 162 of the lower extending road wheels 160 is located behind the point of intersection 23 of the steering axis 21 of the suspension and steering assembly 15 of the vehicle 10 with the ground surface 50.

The ground projection 163 of the rotation axis 162 of the lower extending road wheels 160 and the point of intersection 23 of the steering axis 21 define a distance T1.

Typically, distance T1 is between 5 mm and 35 mm, preferably between 10 mm and 30 mm, and most preferably between 15 mm and 25 mm.

By having the ground projection 163 of the rotation axis 162 of the lower extending road wheels 160 behind the intersection point 23, the hard surface contact patch 176 is generally located behind the intersection point 23, thereby defining a positive trail and improving the handling of the track system 100 over hard surfaces.

Referring now to FIG. 10, the track system 100 comprises road wheels 150/160 on each side of the lower frame portion 124. The road wheels 150/160 located on each side of the lower frame portion 124 define a laterally extending area 158. In the present embodiment, the track system 100 is configured such that the steering axis 21 intersects the area 158 located between the road wheels 150/160.

As shown in FIG. 10, the point of intersection 23 of the steering axis 21 and the center 159 of the area 158 define a lateral distance S1 which is similar to the scrub radius of a wheel.

Typically, distance S1 is between −25 mm and 25 mm, preferably between −15 mm and 15 mm, and most preferably between −5 mm and 5 mm. In that sense, a negative distance S1 occurs when the point of intersection 23 is located outwardly, i.e. farther from the vehicle than the center 159, while a positive distance Si occurs when the point of intersection 23 is located inwardly, i.e. closer to the vehicle than the center 159.

It has been found that when the steering axis 21 does intersect the area 158 between the road wheels 150/160, and better, when the steering axis 21 does intersect the area 158 in its center 159, then the track systems 100 are easier to steer.

Notably, the area 158 and its center 159 are not necessarily located in the center of the traction band. For instance, as shown in the track system 100' of FIG. 11, the traction band 170' could be offset with respect to the drive wheel 110 and road wheels 150/160. Still, even in this embodiment, it would be beneficial to have the steering axis 21 intersects the area 158 between the road wheels 150/160.

Understandably, the combination of the lower extending road wheels 160 which define a smaller contact patch when the track system 100 is operated over hard surfaces, and the position of the road wheels 150/160 such that the laterally extending area 158 therebetween is intersected by the steering axis 21, further improves the steerability and manoeuvrability of the track systems 100 when the vehicle is operated over hard surfaces.

Still, lower extending road wheels 160 and the position of the road wheels 150/160 with respect to the steering axis 21 do not negatively affect the behavior of the track systems 100 over soft surfaces.

As vehicles equipped with track systems are increasingly used over hard surfaces such as packed dirt, increasing the steerability and manoeuvrability of the track systems over hard surfaces is clearly beneficial.

Referring now to FIGS. 12 and 13, another embodiment of a track system 400 is depicted. Track system 400 broadly similar to track system 100 and is configured to replace a steerable wheel of a vehicle such as vehicle 10.

Track system 400 generally comprises a drive wheel 410 (e.g. a sprocket wheel) configured to be mounted to the wheel hub (not shown) of the vehicle 10, the wheel hub being mounted to the steering and suspension assembly 15 of the vehicle 10. The track system 400 also comprises a support frame 420, front and rear idler wheels 430 and 440, road wheels 450, and an endless traction band 470 disposed about the various wheels and configured to be drivingly entrained by the drive wheel 410.

Track system 400 also comprises one set of road wheels 460, in a widthwise direction, which extend lower than all the other road wheels 450.

However, whereas road wheels 160 are pivotally mounted to the lower frame portion 124 of the support frame 120, road wheels 460 are pivotally mounted to a tandem frame 480 which is pivotally mounted to the lower frame portion 424 of the support frame 420.

Also pivotally mounted to the tandem frame 480 are road wheels 455.

In the present embodiment, the tandem frame 480 is configured such that the amplitude of the downward movement of the road wheels 460 is larger than the amplitude of the upward movement.

In the present embodiment, to limit the upward movement of the road wheels 460, either the lower frame portion 424 or the tandem frame 480 comprises a limiter 482, which, in the present embodiment, is an elastomeric (e.g. rubber) stopper. In other embodiments, the limiter 482 could be a spring, a spring assembly, a pneumatic mechanism, etc.

Figure 14A:
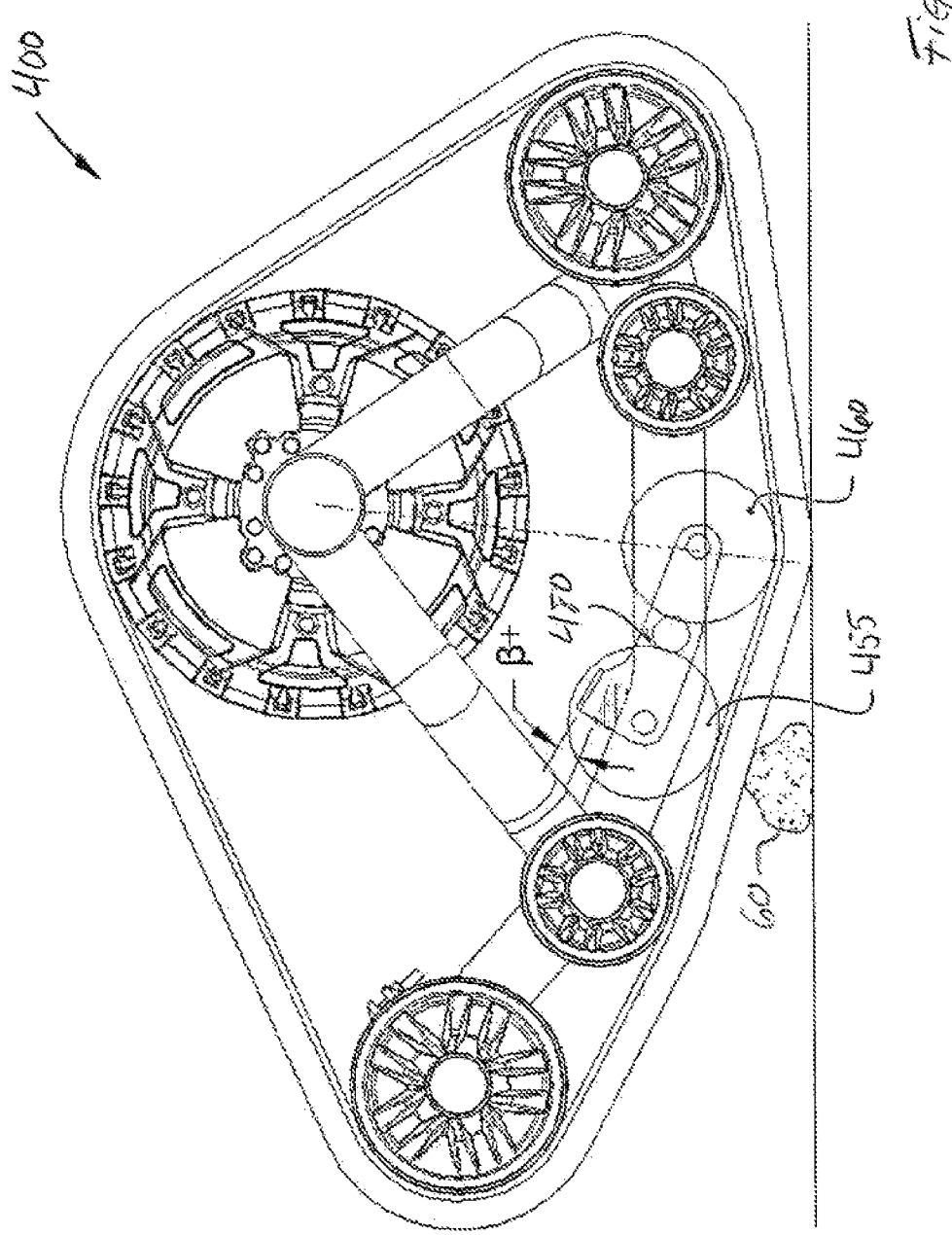
FIGS. 14A and 14B are side views of the track system of FIG. 12, showing the operation of the tandem when the track system overcomes an obstacle.
Figure 14:
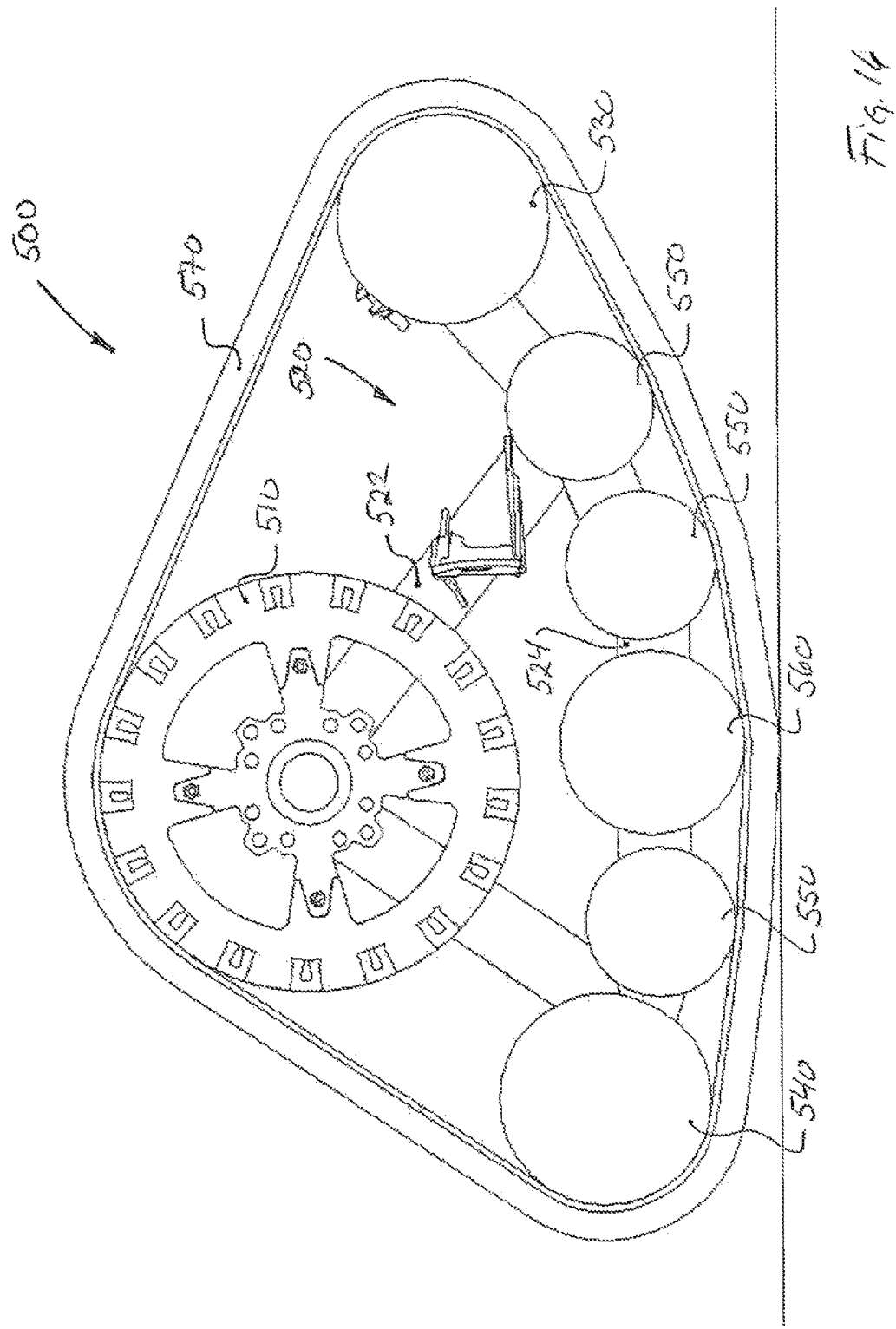

With additional references to FIGS. 14A and 14B, the behavior of the tandem frame is illustrated when the track system 400 overcome an obstacle 60 (e.g. a rock).

In FIG. 14A, as the track system 400 and more particularly the road wheels 455 climb over the rock 60, the tandem frame 480 pivots (clockwise in FIG. 14A) such that the road wheels 455 move upwardly (to overcome the rock 60) and the road wheels 460 move downwardly. In this situation, the downward movement of the road wheels 460 is not limited by the tandem frame 480. It is only limited by the tension in the traction band 470.

Now in FIG. 14B, as the road wheels 460 reach and climb over the rock 60, the tandem frame 480 pivots (counter-clockwise in FIG. 14B) such that the road wheels 460 move upwardly (to overcome the rock 60) and the road wheels 455 move downwardly. However, in this situation, the upward movement of the road wheels 460 is limited by the limiter (e.g. rubber stopper) 482.

Hence, in the track system 400, despite the fact that the road wheels 460 are mounted to a tandem frame 480, the tandem frame 480 is configured such that the road wheels 460 will not move upwardly such that their lowest point become higher than the lowest point of any of the other road wheels 450 and 455.

In addition, in the present embodiment, the tandem frame 480 is also configured such that the rotation axis 462 of the road wheels 460 remains longitudinally behind the point of intersection 23 between the steering axis 21 and the ground 50 during the pivoting movements of the tandem frame 480.

Understandably, the tandem frame 480 allows the track system 400 to more easily follow the unevenness of the terrain over which the track system 400 is operated as opposed to track system 100 which does not comprise a tandem frame.

Referring now to FIGS. 15 and 16, another embodiment of a track system 500 is depicted. Track system 500 is similar to track system 100 and is configured to replace a steerable wheel of a vehicle such as vehicle 10.

Track system 500 generally comprises a drive wheel 510 (e.g. a sprocket wheel) configured to be mounted to the wheel hub (not shown) of the vehicle 10, the wheel hub being mounted to the steering and suspension assembly 15 of the vehicle 10. The track system 500 also comprises a support frame 520, front and rear idler wheels 530 and 540, road wheels 550/560, and an endless traction band 570 disposed about the various wheels and configured to be drivingly entrained by the drive wheel 510.

In track system 500, the road wheels 560 extend vertically lower than all the other road wheels 550 mainly because road wheels 560 have a larger diameter than the other road wheels 550.

Understandably, the road wheels 560 could also be mounted to the lower frame portion 524 such that their rotation axis 562 is also lower than the rotation axes 552 of all the other road wheels 550.

Though not shown for the track systems 400 and 500, these track systems are also configured such that the laterally extending area between the road wheels is intersected by the steering axis when these track systems are mounted to a vehicle such as vehicle 10.

Understandably, though each one of the lower extending road wheels and the reduction in scrub radius individually contributes to improving the steering and manoeuvrability of vehicle equipped with track systems in accordance with the principles of the present invention, the combination of both generally enhances the steering and manoeuvrability of the vehicle equipped with such steerable track systems, particularly when such vehicle is operated over hard surfaces (e.g. packed dirt, pavement, concrete, etc.). However, the lower extending road wheels and the general reduction in scrub radius do not reduce the benefits of track systems in accordance with the principles of the present invention when operated over soft surfaces, which are better floatation and traction.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A track system attachable to a vehicle having a rotatable wheel hub structured for mechanical attachment to a wheel thereto, the system comprising:
    a drive wheel assembly structured to be mechanically attachable to the rotatable wheel hub of the vehicle when the wheel is absent,
    a support frame attached at least one of rotatably to the sprocket wheel assembly, to a suspension assembly of the vehicle, and to a steering assembly of the vehicle,
    front and rear idler wheel assemblies rotatably attached to the support frame,
    a plurality of road wheel assemblies disposed intermediate the front and rear idler wheels, at least indirectly rotatably attached to the support frame, each of the road wheel assemblies having at least one road wheel,
    an endless traction band disposed about the sprocket wheel assembly, the idler wheels assemblies and the road wheel assemblies and,
    when the track system is mounted on a vehicle and is on a planar horizontal ground surface, and only one of the road wheel assemblies of the plurality of road wheel assemblies defines a lower road wheel assembly which extends vertically lower than the other road wheel assemblies, and engages the planar horizontal ground surface is the lower road wheel assembly.

2. The track system of claim 1, wherein the lower road wheel assembly has a pair of concentrically aligned lower road wheels.

3. The track system of claim 2, wherein
a longitudinal distance T1 is measured between intersections of the planar horizontal ground surface with a steering axis and with a lateral plane defined by the vertical projection of a rotation axis of the pair of lower road wheels; and
a lateral distance S1 is measured between intersections of the planar horizontal ground surface with the steering, axis and with a longitudinal plane defined laterally midway between the lower road wheels of the lower road wheel assembly;
the longitudinal distance T1 being between 5 mm and 35 mm, and the lateral distance S1 being between −25 mm and 25 mm.

4. The track system of claim 2, wherein the pair of lower road wheels is positioned on a lower portion of the support frame such that the projection of a rotation axis of the lower road wheels onto the planar horizontal ground surface is longitudinally located rearward of the intersection of the steering axis with the planar horizontal ground surface.

5. The track system of claim 2, wherein a vertical plane centered between the lower road wheels of the lower road wheel assembly is laterally offset from a longitudinal center of the endless traction band.

6. The track system of claim 2, wherein the steering axis intersects a volume defined by the lower road wheel assembly.

7. The track system of claim 2, wherein the pair of lower road wheels is rotatably attached to the support frame such that a rotation axis of the lower road wheels is lower than rotation axes of all other road wheel assemblies.

8. The track system of claim 2, wherein the steering axis intersects the planar horizontal ground surface midway laterally between the lower road wheels.

9. The track system of claim 3, wherein the longitudinal distance T1 is between 10 mm and 30 mm.

10. The track system of claim 3, wherein the longitudinal distance T1 is between 15 mm and 25 mm.

11. The track system of claim 3, wherein the lateral distance S1 is between −15 mm and 15 mm.

12. The track system of claim 3, wherein the lateral distance S1 is between −5 mm and 5 mm.

13. The track system of claim 1, wherein the lower road wheel assembly is indirectly pivotably mounted to the support frame via a wheel-bearing member resiliently mounted to the support frame, the wheel-bearing member structured such that the lower road wheel assembly can be biased to move with respect to the remainder of the support frame.

14. The track system of claim 13, wherein the wheel-bearing member resiliently mounted to the support frame is structured such that the lower road wheel assembly can be biased to move vertically by a maximum downward amplitude and a maximum upward amplitude, the maximum downward amplitude being greater than the maximum upward amplitude.

15. The track system of claim 13, wherein at least one of the maximum downward amplitude and the maximum upward amplitude of movement of the lower road wheel assembly is limited by a limiter either mounted on the lower portion of the support frame or mounted on the wheel-bearing member of the support frame.

16. The track system of claim 1, wherein the steering axis intersects an area of the endless traction band, the area being defined longitudinally by a longitudinal dimension of a contact area at the interface of the endless traction band and the planar horizontal ground surface, and defined laterally by a lateral dimension of a portion of the contact area, the portion located outward of a longitudinal plane defined laterally midway between the lower road wheels of the lower road wheel assembly.

17. The track system of claim 16, wherein the contact area of the endless traction band varies as a function of a hardness of a ground surface, such that when the track system is mounted on a vehicle and is on a soft ground surface, a vertex of the endless traction band located underneath the lower road wheel assembly sinks into the soft ground surface, allowing a greater area of the endless traction band to drivingly and steeringly engage the soft ground surface.

18. The track system of claim 1, wherein each of the road wheel assemblies have a pair of concentrically-aligned wheels.

19. The track system of claim 1, wherein the track system comprises three road wheel assemblies.

* * * * *